F. W. HALE.
TUNING HAMMER.
No. 10,946. Reissued July 24, 1888.
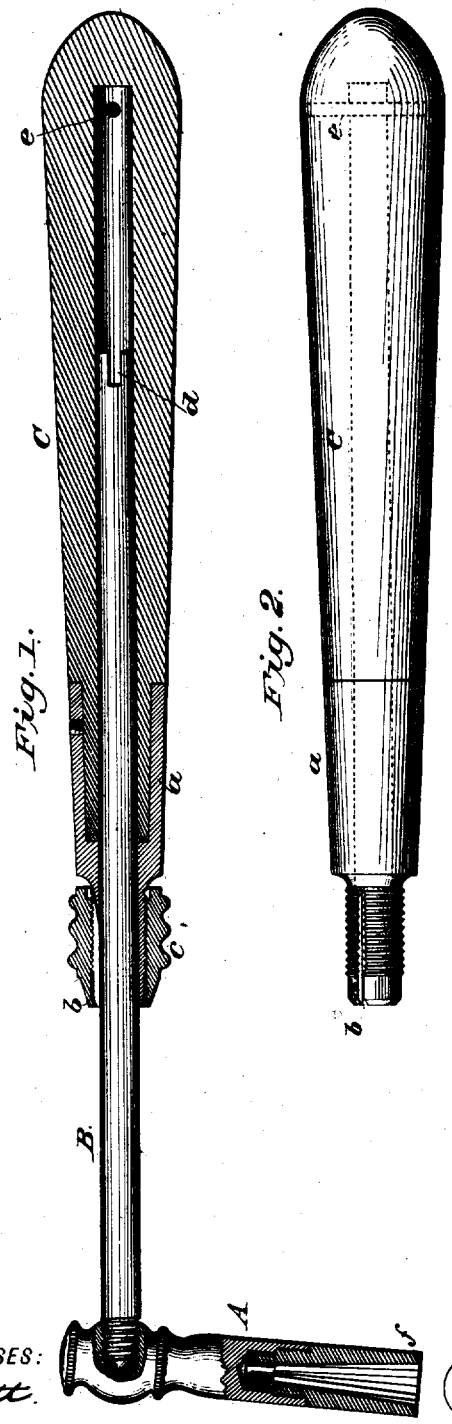
WITNESSES:
E. D. Scott.
E. E. Sears.
INVENTOR.
Francis W. Hale
BY
Samuel N. Pond
his ATTORNEY.
N. PETERS, Photo-Lithographer, Washington, D. C.

UNITED STATES PATENT OFFICE.

FRANCIS WAYLAND HALE, OF BOSTON, MASSACHUSETTS.

TUNING-HAMMER.

SPECIFICATION forming part of Reissued Letters Patent No. 10,946, dated July 24, 1888, Original No. 310,673, dated January 13, 1885. Application for reissue filed March 5, 1888. Serial No. 266,292.

*To all whom it may concern:*

Be it known that I, FRANCIS WAYLAND HALE, of Boston, county of Suffolk, and State of Massachusetts, have invented a new and useful Improvement in Tuning-Hammers, of which the following is a full, clear, and exact description, reference being had to the accompanying drawings, forming part thereof, in which—

Figure 1 is a side view, partly in section, of my device. Figs. 2 and 3 are views in detail.

My invention relates to that class of instruments employed chiefly in tuning pianos, and commonly termed "tuning-hammers;" and my object in my invention is to comprise in a single implement so far as possible the variety of implements usually constituting a tuner's outfit, to arrange in the implement itself the means of its own adjustment, and to adapt it to a wide range of instruments generally.

To this end my invention consists in improved means for securing the stem in its desired adjustment in the hollow handle, in means within the handle for firmly securing the stem in the head or detaching it therefrom, and in means for adapting the head to the various sizes and forms of pins upon which the piano-strings are wound. These features of my invention will be definitely pointed out in the claims.

My hammer has, in common with others of its class, a head, A, a stem, B, and a hollow handle, C. The stem screws into the head at its upper part and telescopes into and out of the cavity of the handle in the well-known manner; but in lieu of the ordinary set-screw passing through the handle to bind the stem in its adjusted position in the handle, which set-screw is an annoyance to the hand, is easily lost, and, besides, often holding but insecurely, requires an additional implement, a screw-driver or wrench, to operate it—in lieu of this I prolong the ferrule *a* upon the handle and reduce its thickness, so as to render it when split, as at *b*, sufficiently elastic. This reduced part is preferably screw-threaded to receive the clamping-nut *c*. Either the screw-threaded ferrule or the nut, or both, are made very slightly tapering at the engaging parts to secure the clamping action. In some cases, when the ferrule and the nut are considerably elongated, the clamping action may be obtained by simply a smooth tapering fit of one upon the other; but I prefer the threading of the parts. This construction causes the end of the handle to clasp the stem firmly all around it, which is not the case in the old set-screw construction, and the nut, being of some size and suitably milled, is easily operated by the fingers, so that no wrench or screw-driver is needed.

In order to firmly screw the stem into the head, or to detach it therefrom, I employ, in addition to the before-described connection of the handle and stem, a clutch device to positively rotate the stem by the handle.

My preferred form of clutch is a fork, *d*, formed upon the end of the stem within the handle, which, when the stem is pushed far into the handle, engages a pin, *e*, which passes through the handle and through the cavity of it. This makes it impossible for the stem to turn in the handle.

The difference in the sizes and forms of pins upon which the strings of different pianos are wound has rendered it necessary for a tuner to keep a variety of hammers, or at least of heads with differently sized or formed sockets. I avoid this by forming the socket portion of the head in a separate piece, *f*, and I attach it to the head, a threaded portion of the one part being entered into a similarly-threaded socket in the other part. With this construction it is necessary only that a tuner provide himself with the necessary variety of socket portions or tips.

In order to obtain the best results with this construction, I form the head proper of soft steel and harden the threaded socket into which the lower part or tip is entered. The tip is of the best tool-steel, left soft at its threaded part, but hardened at its socket end. This construction, with the soft steel threaded part engaging the hardened portion of the head, enables me to avoid the necessity of a set-screw to prevent one part from turning in the other. When these two parts are firmly screwed together, there is sufficient friction to prevent the tip unscrewing when necessary to turn the pin back.

I may make the socket in the tip double, or with the cross-sectional form of two squares or two triangles intersecting each other.

Having thus fully described my invention, what I claim, and desire to secure by Letters Patent, is—

1. The combination of the tubular handle C, the tubular ferrule *a* thereon, having its forward part elongated and reduced, split, and externally threaded, the round stem B, adapted to slide and swivel in said handle, the clamping-nut *c*, and the head A *a* of the tuning-hammer, as and for the purpose set forth.

2. The combination of the head A of a tuning-hammer, formed of steel, threaded at its lower part, and hardened thereat, and the tip *f*, also of steel soft at its threaded nipple and hardened at its lower end, whereby the threads of the tip bind in the head, which prevents the tip from unscrewing when the hammer is turned to let down a string, as set forth.

3. In a tuning-hammer, the combination, with the head A and stem B, united by screw-threaded nipple and socket, of the fork *d* upon the end of the stem, and the fixed pin in the interior of the handle for the purpose of screwing the stem into and unscrewing it from the head, as set forth.

In testimony whereof I have signed this specification, this 25th day of February, 1888, in presence of two witnesses.

FRANCIS WAYLAND HALE.

Witnesses:
WM. G. DINSMORE,
EDWARD DARFORTH HALE.